(12) United States Patent
Guo et al.

(10) Patent No.: US 8,665,766 B2
(45) Date of Patent: Mar. 4, 2014

(54) METHOD OF OBTAINING A MULTIMEDIA BROADCAST MULTICAST SERVICE SUPPORTING ABILITY OF A CELL

(75) Inventors: Longping Guo, Shenzhen (CN); Hengxing Zhai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 453 days.

(21) Appl. No.: 12/597,342

(22) PCT Filed: Aug. 23, 2007

(86) PCT No.: PCT/CN2007/002548
§ 371 (c)(1),
(2), (4) Date: Oct. 23, 2009

(87) PCT Pub. No.: WO2008/128391
PCT Pub. Date: Oct. 30, 2008

(65) Prior Publication Data
US 2010/0118759 A1    May 13, 2010

(30) Foreign Application Priority Data

Apr. 24, 2007  (CN) .......................... 2007 1 0074097

(51) Int. Cl.
*H04L 12/26*   (2006.01)

(52) U.S. Cl.
USPC ........................................................ 370/312

(58) Field of Classification Search
None
See application file for complete search history.

(56) References Cited

U.S. PATENT DOCUMENTS

| 2004/0022218 | A1* | 2/2004 | Kim et al. ...................... 370/335 |
| 2005/0007971 | A1* | 1/2005 | Jeong et al. ..................... 370/312 |
| 2005/0111395 | A1* | 5/2005 | Hwang et al. .................. 370/313 |
| 2009/0003288 | A1* | 1/2009 | Chen et al. ..................... 370/336 |

FOREIGN PATENT DOCUMENTS

| CN | 1568047 | 1/2005 |
| CN | 1691676 | 11/2005 |
| CN | 1744519 | 3/2006 |
| CN | 1913699 | 2/2007 |

OTHER PUBLICATIONS

International Search Report; PCT/CN2007/002548; Feb. 14, 2008; Y. Zhou.

* cited by examiner

*Primary Examiner* — Raj Jain
(74) *Attorney, Agent, or Firm* — Christopher L. Parmelee; Walker & Jocke

(57) ABSTRACT

A method for obtaining the MBMS supporting ability of a cell is disclosed. The method concludes: step 1 in which RNC transmits an audit request message to Node B; step 2, the Node B returns an audit response message containing the MBMS supporting ability information of the cell to the RNC. With the present invention, the RNC can obtain the MBMS supporting ability information of the cell, and obtain the MBMS supporting ability changing information of the cell in real time and correctly.

2 Claims, 2 Drawing Sheets

METHOD OF OBTAINING A MULTIMEDIA BROADCAST MULTICAST SERVICE SUPPORTING ABILITY OF A CELL

FIELD OF THE INVENTION

The present invention relates to communication field, in particular to a method by which RNC (Radio Network Controller) can obtain the MBMS (Multimedia Broadcast and Multicast Service) supporting ability of a cell in CDMA (Code Division Multiple Access) mobile communication system.

BACKGROUND OF THE INVENTION

MBMS is one technology by which a shared network resource transmits data from one data resource to multiple targets. In order to effectively utilize the mobile network resource, 3GPP ($3^{rd}$ Generation Partnership Project) proposes MBMS service in R6, that is, the mobile network is provided with the point-to-multipoint service in which data is transmitted from one data resource to multiple users, so as to achieve the sharing of the network resource, and in turn improve the network resource, particularly the utilization efficiency of the valuable air interface resource. MBMS can not only realize the low-speed message-class multicast and broadcast of pure text, but also achieve the multicast and broadcast of high-speed multimedia service, providing various abundant video, audio and multimedia services whereby the development of mobile communication has better perspective.

The setup model of the MBMS service system is shown in FIG. 1.

BM-SC (broadcast and multicast service center) is a new mobile network function utility which is the entrance of the content provider, used for the authorization and the initiation of MBMS bearing service in the mobile network and for transmitting the MBMS content according to schedule.

For the existing WCDMA packet network function utilities, i.e., GGSN (General Packet Radio Service Gateway Support Node), SGSN (Serving General Packet Radio Service Support Node), RAN (Radio Access Net) and UE (User Equipment), it is also needed to add functions and processes associated with MBMS.

RAN includes RNC and Node B. MBMS introduces into RAN three new logical channels, which are MCCH (MBMS point-to-multipoint Control Channel), MTCH (MBMS point-to-multipoint Traffic Channel) and MSCH (MBMS point-to-multipoint Scheduling Channel). The three newly added logical channels are all mapped onto FACH (Forward Access Channel) which is mapped onto SCCPCH (Secondary Common Control Physical Channel). MBMS also introduces one new physical channel, MICH (MBMS point-to-multipoint indicator) into RAN. What is carried on MICH is MBMS notification indicator with small amount of information and will be read in by UE (User Equipment) in a very short period of time. While what is carried on MCCH is detailed MBMS service notification, RB (Radio Bearer) configuration and other MBMS control information, when the amount of MBMS services carried by a cell is relatively large, the amount of information carried by MCCH is very large and will be read in by UE in a relatively long period of time. Hence, UE can determine whether it is necessary to read in MCCH message through monitoring MICH, so as to achieve the discontinuous reception of MCCH and prolonged standby time of UE.

MBMS service has two transmitting manners in RAN, i.e., PTP (point to point) and PTM (point to multipoint). With PTP transmitting manner, the data is transmitted through DTCH (Dedicated Traffic Channel) which is uniquely occupied by one UE, while with PTM manner the data is transmitted through MTCH (common logical channel) which is shared by multiple UEs.

For supporting MBMS service, RAN has to have MBMS supporting ability, represented by the MBMS supporting ability of a cell, that is, MBMS service only can be transmitted in the cell which supports MBMS. If the cell supports MBMS, during the setting up of the common channels in the cell, RNC needs to notify Node B to set up MICH physical channel in the cell and the setup of MICH channel must be bound with the setup process of FACH and SCCPCH bearing MCCH logical channel. The detailed process is shown in FIG. 2. In FIG. 2, to request the setup of MCCH-carrying FACH and SCCPCH, RNC transmits to the Node B the COMMON TRANSPORT CHANNEL SETUP REQUEST which also carries configuration parameters required by the setup of MICH physical channel therewith. If the cell supports MBMS, Node B sets up MCCH-carrying FACH and SCCPCH after receiving the message, and sets up and activates the MICH physical channel according to the MICH parameters carried in the message. At the same time, the association relationship between MICH and SCCPCH bearing the MCCH is built up. Then a message of COMMON TRANSPORT CHANNEL SETUP RESONSE is returned to RNC which, upon receiving the response message, broadcasts in the broadcast message the information of MCCH-carrying SCCPCH and FACH to all UEs in the cell. At this point, MCCH and MICH are successfully set up and the cell can support MBMS service. If the cell does not support MBMS, Node B does not set up MICH channel and FACH and SCCPCH used for bearing MCCH after receiving the message and returns the message of COMMON TRANSPORT CHANNEL SETUP FILURE to RNC with the indicated reason of failure, "MICH not supported". At this point, the setup of MCCH and MICH is failed and the cell can not support MBMS service.

According to the current 3GPP protocol, Node B does not report the MBMS support ability of the cell to RNC, therefore RNC does not know whether the cell of Node B supports MBMS or not. Before setting up the MICH channel and the FACH and SCCPCH bearing the MCCH, RND does not know whether the setup can be successful in the corresponding cell. RNC does not know that the cell does not support MBMS until RNC attempts the setup with the Node B returning "failure" and the indicator being "MICH not supported". Therefore, according to the current protocol, RNC can not obtain the MBMS ability information of the cell before attempting the setup of MICH channel. Normally, RNC can learn the MBMS supporting ability of the cell only by making the configuration and the like and then it notifies the Node B to set up MICH channel and MCCH channel in the corresponding cell. However, the method, similar to the configuration method, is often unreliable, furthermore, the complication degree of the system maintenance is greatly increased.

SUMMERY OF THE INVENTION

In view of the above problems, the present invention is proposed. Hence, the present invention is directed at providing a method for obtaining the MBMS supporting ability of a cell.

The method according to the present invention includes the following steps:

Step 1: RNC transmits an audit request message to Node B;

Step 2: Node B returns an audit response message to RNC wherein the audit response message contains MBMS supporting ability information of a cell;

Meanwhile, said method further includes the step in which when the MBMS supporting ability of the cell of Node B is changed, Node B reports a resource status indication message to RNC wherein the resource status indication message includes MBMS supporting ability information of the cell.

Meanwhile, said method further includes the step in which RNC periodically transmits the audit request message of the above step to Node B and Node B periodically returns the audit response message as well, such that RNC obtains the latest information about the MBMS supporting ability of the cell.

With the present invention, the following advantages are achieved. RNC can obtain the MBMS supporting ability information of the cell and also obtain the information about the change in the MBMS supporting ability of the cell in real-time and correctly.

Other features and advantages of the present invention will be described hereinafter and become obvious partly from the Description, or be learned by implementing the present invention. The objects and other advantages of the present invention can achieved and obtained by the setup specifically indicated in the Description, Claims and Figures.

BRIEF DESCRIPTION OF THE DRAWINGS

The drawings are used for providing a further understanding to the present invention and constitute a part of the application. The drawings together with the exemplary embodiments of the present invention are used for explaining the present invention but are not limitative of the present invention, and wherein.

DETAILED DESCRIPTION

The preferable embodiments of the present invention will be described in conjunction with the drawings hereinafter. It should be appreciated that the preferable embodiments described herein are provided only for illustrating and explaining the present invention but not for limiting the present invention.

Figure 1:
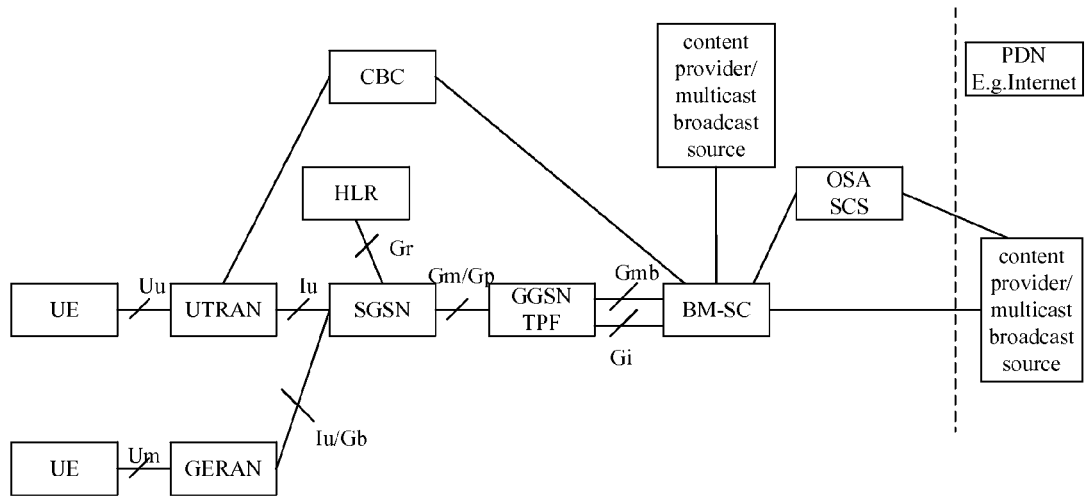
FIG. 1 is a structural model view of MBMS service system.
Figure 2:
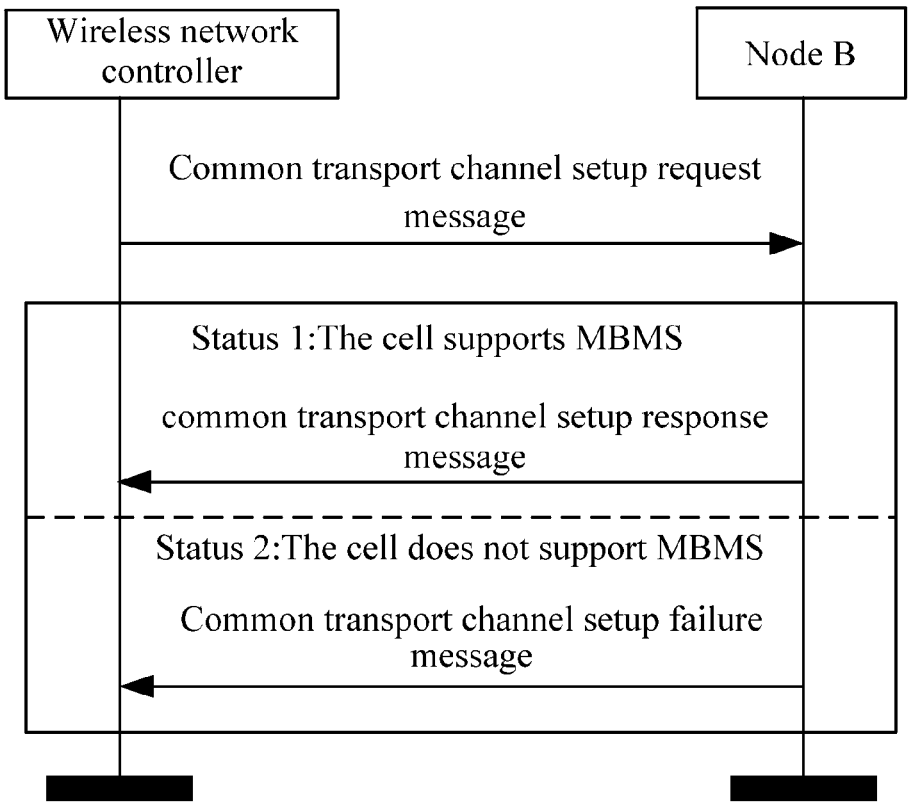
FIG. 2 is a flowchart of setting up MCCH and MICH for the current protocol.
Figure 3:
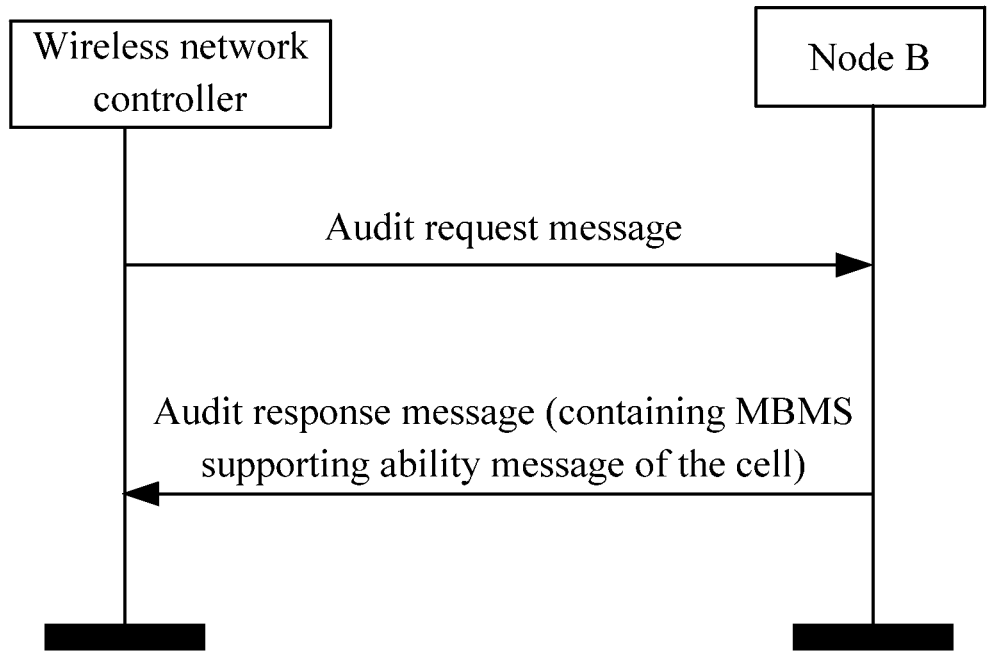
FIG. 3 is an audit flowchart of the present invention.
Figure 4:
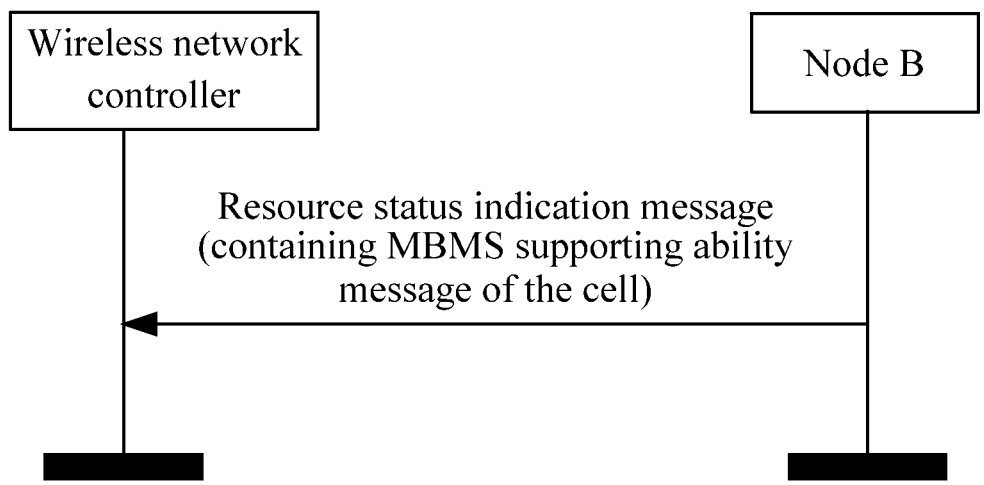
FIG. 4 is an indication flowchart of the resource status of the present invention.

In the technical solution of the present invention, during the audit process and the resource status indication, Node B reports MBMS supporting ability information of the cell and the information about the change in the MBMS supporting ability to RNC, as shown in FIGS. 3 and 4.

Before MCCH and MICH are set up, RNC obtains the MBMS supporting information of the corresponding cell as follows:

Step 1: RNC transmits audit request message (AUDIT REQUEST) to node B;

Step 2: Node B returns audit response message (AUDIT RESPONSE) to RNC wherein the message contains the information about the multimedia broadcast and multicast service supporting ability of the cell (the process is shown in FIG. 3).

In this way, RNC, when learning that the cell does not support MBMS, does not attempt to set up MICH and the FACH and SCCPCH bearing the MCCH, which reduces the unnecessary trouble.

When the MBMS supporting ability of the cell of Node B is changed, Node B reports the resource status indication message (RESOURCE STATUS INDICATION) to RNC, wherein the message contains the MBMS supporting ability information of the cell (the process is shown in FIG. 4).

In this way, when the MBMS supporting ability of the cell is changed from non-supporting to supporting or from supporting to non-supporting, RNC can obtain such change information in real-time and correctly.

In addition, RNC can also periodically transmit the audit request message of the above Step 1 to Node B and Node B also periodically returns the audit response message, such that RNC can obtain the change information of MBMS supporting ability of the cell correctly.

The above descriptions are only preferable embodiments of the present invention, which are not used to restrict the present invention. For those skilled in the art, various changes and variations may be made to the present invention. Any amendments, equivalent substitutions, improvements etc. within the spirit and principle of the present invention are all covered by the scope of protection of the present invention.

What is claimed is:

1. A method for obtaining multimedia broadcast and multicast service supporting ability of a cell, comprising the following steps:

Step 1: Radio Network Controller transmitting an audit request message to Node B;

Step 2: Node B returning an audit response message to the Radio Network Controller wherein the audit response message contains the multimedia broadcast and multicast service supporting ability information of the cell, wherein the multimedia broadcast and multicast service supporting ability information indicates whether the cell supports multimedia broadcast and multicast service;

wherein when the multimedia broadcast and multicast service supporting ability of the cell of Node B is changed, Node B reports a resource status indication message to the Radio Network Controller wherein the resource status indication message includes information of the changed multimedia broadcast and multicast service supporting ability of the cell, wherein the change of the multimedia broadcast and multicast service supporting ability of the cell of Node B comprises that the MBMS supporting ability of the cell is changed from non-supporting to supporting or from supporting to non-supporting.

2. The method for obtaining multimedia broadcast and multicast service supporting ability of a cell according to claim 1, characterized in that the method further comprises:

the Radio Network Controller periodically transmits the audit request message of the above Step 1 to Node B and Node B periodically returns the audit response message as well, such that the Radio Network Controller obtains the latest information about the multimedia broadcast and multicast service supporting ability of the cell.

* * * * *